United States Patent [19]

Priamo et al.

[11] Patent Number: 4,530,090
[45] Date of Patent: Jul. 16, 1985

[54] TELECOMMUNICATIONS SYSTEMS WITH USER PROGRAMMABLE FEATURES

[75] Inventors: Lawrence Priamo; Robert B. MacKenzie, both of Guelph, Canada

[73] Assignee: International Standard Electric Corporation, New York, N.Y.

[21] Appl. No.: 518,777

[22] Filed: Jul. 29, 1983

[51] Int. Cl.³ .......................... H04Q 11/04; H04J 3/02
[52] U.S. Cl. .......................................... 370/58; 370/85
[58] Field of Search .............................. 370/58, 85, 95

[56] References Cited

U.S. PATENT DOCUMENTS

| | | | |
|---|---|---|---|
| 3,961,140 | 6/1976 | Carbrey | 370/95 |
| 4,140,877 | 2/1979 | Joslow et al. | 370/95 |
| 4,254,499 | 3/1981 | Yoshikane | 370/85 |
| 4,322,845 | 3/1982 | Fennel, Jr. et al. | 370/95 |
| 4,354,262 | 10/1982 | Guézov et al. | 370/58 |
| 4,379,950 | 4/1983 | Ahmed | 370/58 |
| 4,455,647 | 6/1984 | Gueldner | 370/85 |

*Primary Examiner*—Douglas W. Olms
*Assistant Examiner*—Wellington Chin
*Attorney, Agent, or Firm*—John T. O'Halloran; Thomas F. Meagher

[57] ABSTRACT

A processor controlled PBX system with central control and distributed group control using a processor per group. The PBX employs time division controlled speech transmission and data switching. Features of the system are programmable by the system maintenance personnel. The programmable features include the number of time slots or channels in use triggering a priority call control mode. The transfer of data between processors for monitoring may also be controlled along with the correction of data in system backup memory.

3 Claims, 5 Drawing Figures

TELECOMMUNICATIONS SYSTEMS WITH USER PROGRAMMABLE FEATURES

BACKGROUND OF THE INVENTION

The present invention is directed to a processor controlled or stored program telecommunications system similar to that shown by U.S. Pat. No. 4,339,633 issued July 13, 1982 and U.S. Pat. No. 4,379,950 issued Apr. 12, 1983 both to F. Ahmed. The system shown by the cited references is manufactured and sold by ITT Corporation under the name System 3100, and uses a two level control with a system controller common to the system and a plurality of group controllers, one per group of ports. Ports of the system may be standard single line station instruments, multi-line station instruments or trunks. In the system shown by the references, there are a number of features that are user programmable under the control of a remote, portable maintenance and diagnostic terminal, called a MAP panel. Note that the term user as applied in this specification refers to the sytem user or maintenance or supervisory personnel of the system owner or leaser to be distinguished from a port user of a station instrument or data terminal at a system port. With such a terminal, the status and class of service of ports of the system may be changed. Also in response to control from the panel, data from the system backup memory maintained on Electronically Alterable Read Only Memory (EAROM) can be loaded into the program memory which is stored in a random access memory (RAM).

The reference system is a processor-controlled, digital PBX/key system using eight bit PCM words for speech transmission, and asynchronous eight bit words for station control signalling on multi-line telephone instruments. The reference system has a maximum of one hundred and forty-four ports while using a one hundred and ninety-two time slot PCM speech bus for the system. Since there are more speech time slots available than ports, the system shown is in inherently non-blocking one. At the group level, there are twenty-four time slots per group and twenty-four ports.

Further, in the system shown by the references, a static RAM of 4k capacity is employed as the primary program memory within the system memory. Data concerning ports, features and class of service to be provided to specific ports may be changed in the program memory by the diagnositc terminal user. This data is also changed on the back up memory to place the back up and program memories in agreement. In the system shown by the references, the backup memory is EAROM and the method employed in placing the memories in agreement is to erase the entire EAROM memory and to restore the new data into from the backup memory.

Further, the system shown by the references stores its group controller work areas in RAM areas which are directly accessible from the MAP panel.

SUMMARY OF THE INVENTION

The present invention is directed to a system similar to that of the cited references but of larger port capacity. Using the same basic, two level architecture, the present system has a maximum total of 288 ports within the six groups of the system in place of the 144 ports of the reference system. The PCM bus for the system has only 192 time slots (also called channels) available for speech transmission, thus there is the possibility of call blocking on the system PCM speech bus. For example, of the 192 time slots available, only one hundred and ninety are used, most frequently eight are dedicated for the transmission of tones, one channel is reserved for music on hold and two channels are reserved for an attendants console. If more than one attendants console is used, two time slots are dedicated for each such console.

Assuming one attendants console, eleven time slots of the 190 are not available for allocation to station or trunk calls leaving 179 time slots available for the system ports, which as mentioned, may total 288 in number. The problem of time slot allocation and possible blocking could be controlled either at the group level by, (a) providing a lesser number of group time slots on the group bus than the maximum number of ports of the group, i.e., allow blocking at the group bus level and not at the system bus levelor, (b) providing sufficient group time slots to avoid blocking at the group level and allow controlled possible blocking at the system level. The latter approach was selected.

To implement this choice, each group of ports having a maximum of forty-eight ports has forty-eight time slots on its group bus so that there is no blocking at the group level. The possibility of blocking of course therefore arises at the system level where a maximum of 288 ports could be seeking use of 181 time slots on the system PCM bus. In evaluating the problem, it was determined that on a scale of importance, incoming trunks should be given priority once the number of time slots in actual use reaches a settable number at which the possibility of blocking becomes a more probable occurrence. For this purpose, when the available number of time slots reaches the number which has been set—assume twenty, a priority mode is initiated. In the priority mode, stations attempting to initiate a call receive a busy signal from one of the dedicated tone time slots and only incoming trunks are allotted a pair of time slots or channels (one for the transmit direction and one for the receive direction). Further, when all available time slots are in use, any incoming trunks seeking time slots are placed on a queue and are allotted time slots as they become available. Stations seeking service receive the busy signal.

The number of time slots available which trigger the priority mode may be set at a desired number by the system user through the diagnostic terminal or MAP panel.

Further, in view of the considerably larger program memory required by the larger system, the method employed in transferring data between the program memory RAM and the backup memory had to be speeded up or changed. In the smaller system, in response to a copy command from the diagnostic terminal, the entire contents of the backup memory was erased and the data of the RAM program memory was transferred to the backup memory.

In the present invention, the copy command instituted a byte by byte comparison of RAM memory and backup in EEROM memory. Only when a difference is found in a comparison is a byte erased and the correct or corrected byte inserted in its place in the backup memory. This approach shortens the window for error or noise induced false information, since the time interval of actual writing is short. After a byte is written into backup memory, it is again compared with the byte from which it was copied to ensure that it was copied correctly before attention is directed to the next byte to be copied.

In addition, the unshared memory of a group controller may be transferred on a signal from the diagnostic terminal to storage in a shared memory area for transfer of the stored data to the system controller for verification. Once the data has been verified, it may be returned from the shared area of the group controller memory to the unshared area for retention and use therein.

DETAILED DESCRIPTION

The present invention is directed to a two level distributed processor controlled telecommunications system usable as a PBX or hybrid PBX/key system, as disclosed and claimed in the previously cited references.

Figure 1:
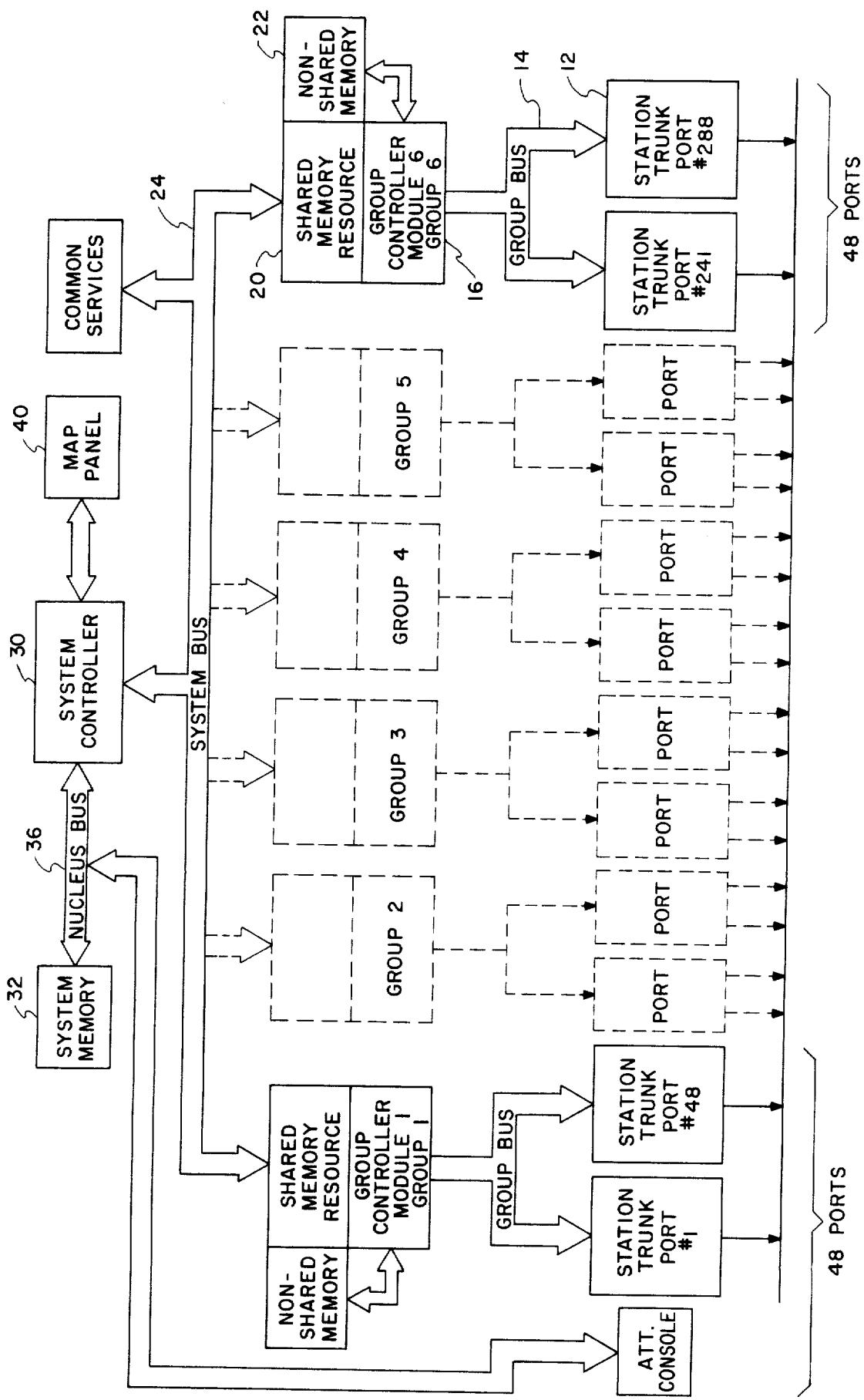
FIG. 1 is a functional block diagram of the present system.

The system shown in FIG. 1 in block form has two level architecture, i.e., system level processor and a plurality of group processors, one per group, for controlling up to six groups of ports 12 with up to 48 ports per group with a maximum of 288 ports for the system. The ports may be stations or trunks. Each station has an instrument (not shown) which may be of the well-known 500 type two wire line type for a single line or may be an electronic telephone of the type shown by U.S. Pat. No. 4,315,110 issued Feb. 9, 1982 to J. Davis for multiple line key system usage with four wires per port.

Each station instrument or trunk line is connected to a port which acts as an interface between the subscriber instrument (or the line) and the system to convert signals from the instrument (or trunk) into the proper format for use in the system. The ports or interfaces of a group communicate over a 48 time slot group bus 14 with the group controller 16. This group controller includes a microprocessor which is preferably an 8085 processor working with a memory which includes two areas, a shared memory resource 20 as explained by the cited Ahmed patent '950, and a non-shared memory 22. The shared memory area is used for storing data necessary to call processing to allow transfer of the data to the system controller 30 over the system bus 24.

As described by the '950 patent, the interchange of information between each group control processor and the system processor uses the shared memory of respective group 16. This shared memory is purposely maintained at a comparatively small level such as one K of memory per group.

Figure 5:
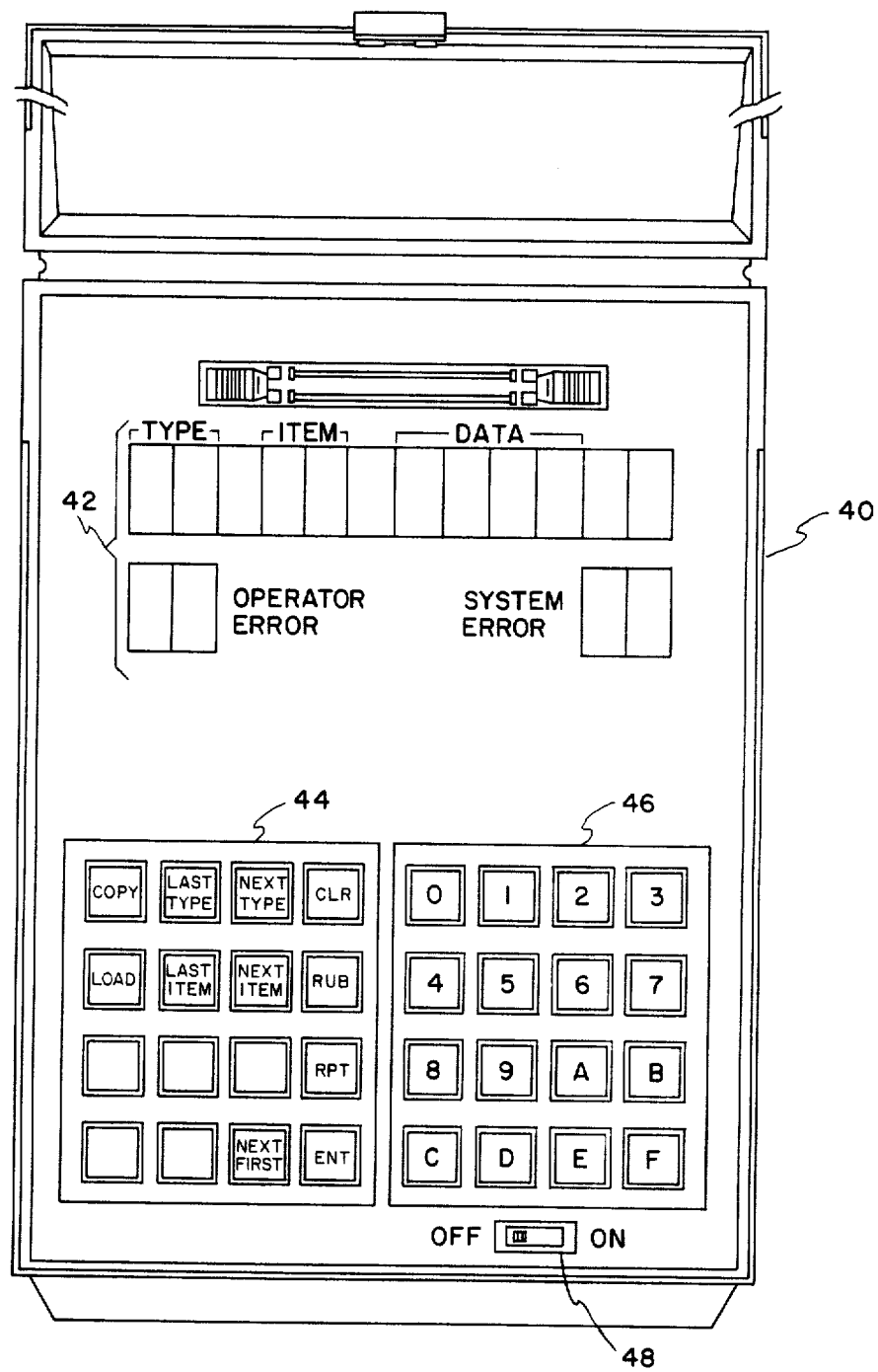
FIG. 5 is a front view in elevation of a user operated manual panel, as used herein.

The groups have access to the system bus through the shared memory resources of the group memory as shown in detail in the later issued of the two cited Ahmed patents and as shown in FIG. 1. The system bus is coupled to the system controller which includes a processor, preferably of the type known as the 8088 type. The system controller has a system memory 32 accessible only to the system controller over a nucleus bus 36 through which the system controller may access an Attendants console as shown. Also having access to the memory is a maintenance, administration programming (MAP) panel 40 used to enter and display programmable data in the system memory. The MAP panel is a portable unit cabled to the controller through a 34 conductor cable. The panel, as seen in FIG. 5, includes a sixteen character segmented display 42, two sixteen button key pads 44 and 46 mounted side by side and a suitable on/off switch 48. Key pad 44 has a number of function keys as shown by the table, the other key pad 46 having the ten numbered keys of a decimal system and six letter keys, the function of which will be explained later.

Also coupled to the system bus are the common services circuits shown in some detail in the cited Ahmed patents for providing system features as conferencing and tones, dial pulse registers and the like for the system. In addition, the attendant control console is coupled directly to the nucleus bus at the system controller for connecting one or more attendants positions to the system.

Figure 2:
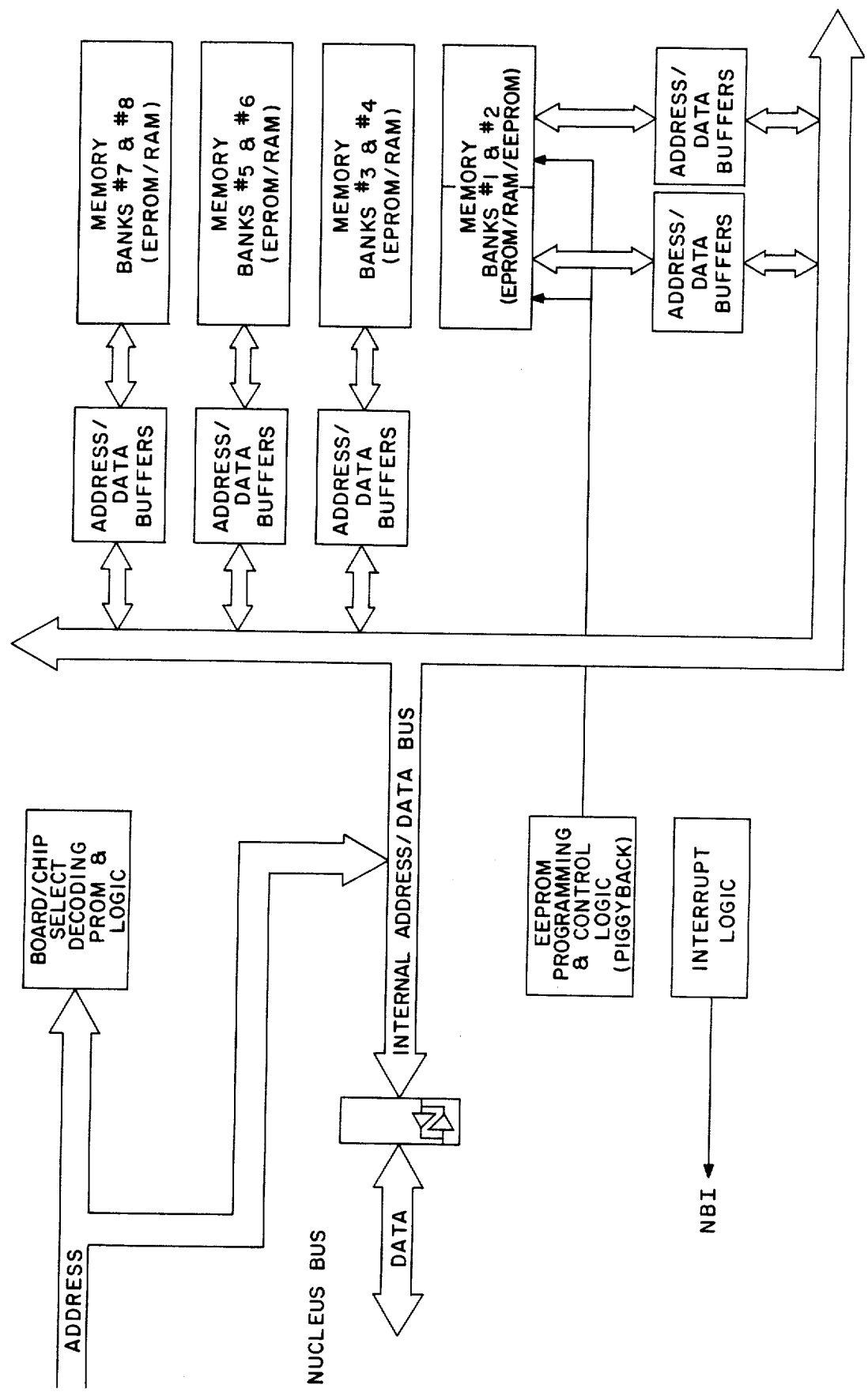
FIG. 2 is a functional block diagram of the system memory of FIG. 1 in greater detail.

The system memory shown in block form in FIG. 2 includes up to eight banks or blocks of memory chips made up of three types of memory, program memory in EPROM (Erasable and Programmable Read Only) memory, scratch pad or file memory in RAM (random access memory) and data base back up memory in EEROM (Electronically Erasable Read Only Memory). Each memory chip has two K bytes of memory.

Each memory bank has address/data buffer interfacing between the banks and an internal address/data bus which forms the nucleus bus previously referred to. Address information from the bus is exchanged with the mapping Logic and PROM noted as the Board/Chip Select Logic. The mapping logic selects the chip and section of chip within a bank.

The EEPROM programming logic is required since EEPROM memory uses a higher voltage for writing than the ROM or RAM memory. Further due to the slower speed of a writing operation on EEPROM than on either ROM or RAM, a control logic must be used. Interrupt logic is activated when the EEROM has been written in for a period of approximately 10 milliseconds. An interrupt is generated at that time to notify the system controller that the EEROM byte writing operation has been performed.

Figure 3:
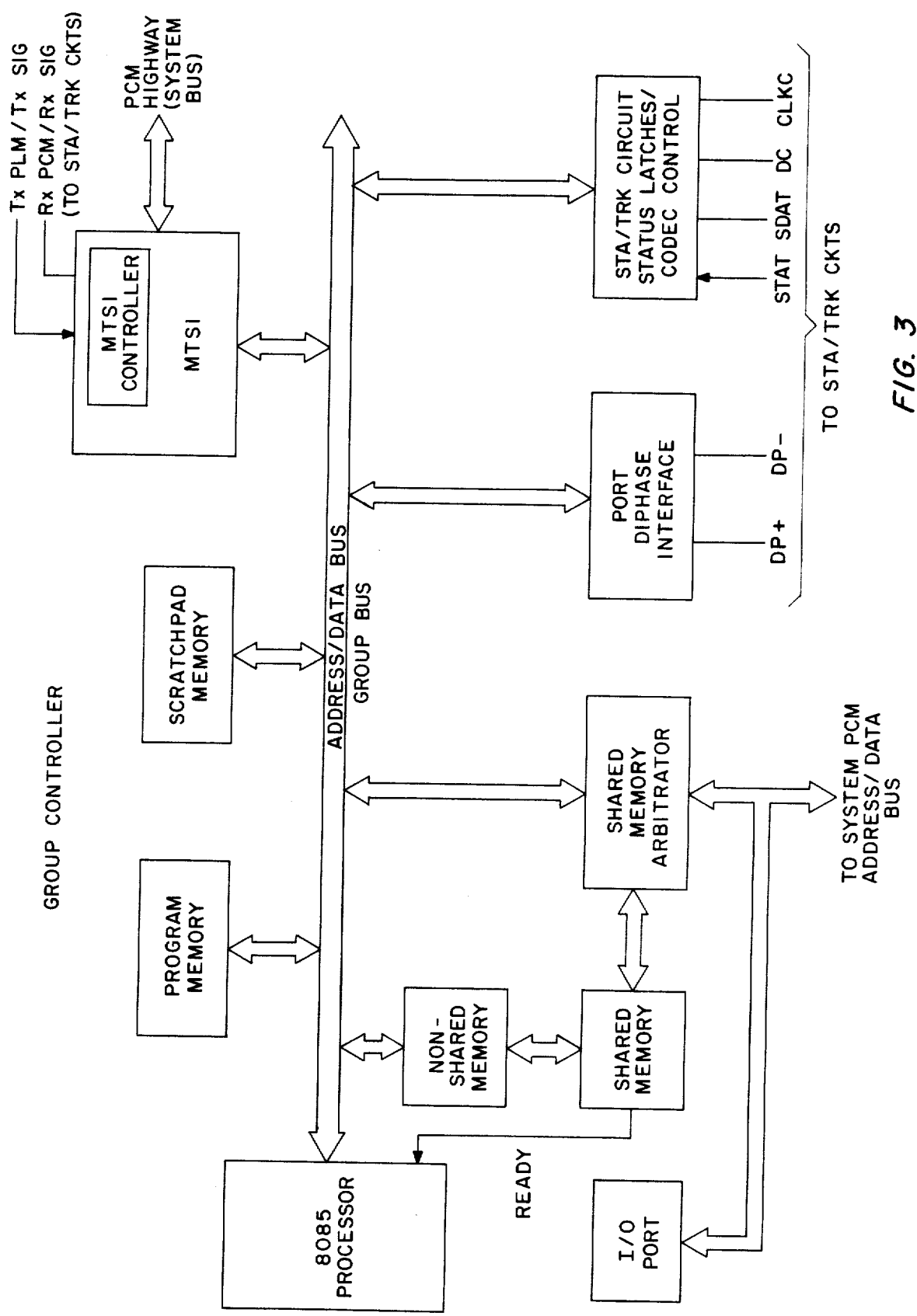
FIG. 3 is a functional block diagram of the Group Controller within the system of FIG. 1.

FIG. 3 shows a typical group controller with its processor and memories accessible to the processor over a group (address and data bus). Shown are a program memory, scratchpad memory, shared and unshared memory, time slot interchanger and additional circuits. The additional circuits serve to interface between the group and the ports of the system as interface and as latches and codec control. The latter is required since a codec is employed at each port to code information to the system in suitable PCM format.

As mentioned previously, call processing information necessary for use by the system controller is stored in shared memory of the group controller for transfer to the system memory over the system bus when indicated. Data from the system bus also is transferred to the group control through the shared memory. To determine whether data should be sent from the shared memory of the group controller to the system controller or from the system controller to the shared memory of the group controller, a shared memory arbitrator is used. A similar arbitrator for a like function is disclosed in the cited Ahmed U.S. Pat. No. 4,379,950.

Figure 4:
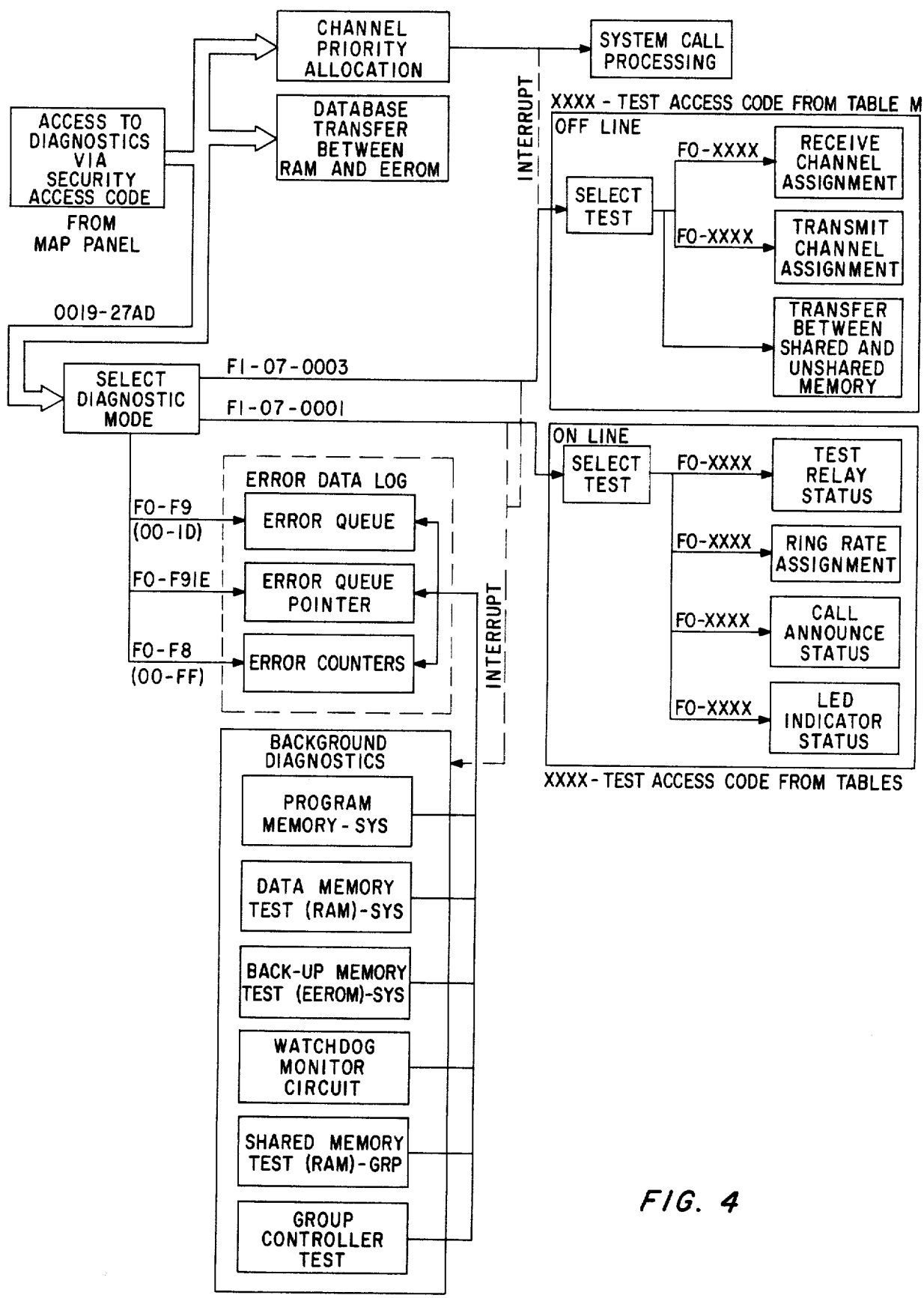
FIG. 4 is a block diagram of the diagnostic, maintenance and user programmable procedures for the system.

In FIG. 4, the maintenance procedures and diagnostic procedures of the system are shown in block diagram form. The diagnostic procedures fall into three main categories, i.e. background diagnostics, on-line diagnostic and off line diagnostic. The desired diagnostic is accessed by keying in a security access code on the hexadecimal key pad, and thereafter keying in additional codes to enable or disable the necessary routines.

Background diagnostics are performed during the processor's idle time and generally do not affect any call processing. These include the program memory test to check the validity of programmed instructions and data. The data memory test verifies the operation of the system scratch pad memory. The back up memory test, as explained in greater detail later, verifies that the contents of the back up memory correspond to information stored in the scratch pad memory. The shared memory RAM test verifies that the contents of the shared memory within a group memory correspond to information stored in scratch pad memory for that group. By proper addressing, non-shared memory may be transferred to shared memory for various checks.

Off line tests include the check of receive channel and transmit channel assignments. Since these test interfere with system operation, call processing and background diagnostics are suspended while the tests are in process. Included in the off-line diagnostic tests in the procedure for transferring data from unshared memory to shared memory for subsequent transfer to system control for analysis.

Under the general heading of maintenance procedures are included the channel priority allocation for setting the number of time slots or channels in the priority grouping and the implementation of transfer of memory data between RAM and EEROM back up memory, as diagnosed by the background diagnostic procedure.

The system speech bus is provided with one hundred and ninety-two time slots usable for transmitting and receiving speech data in suitable time division coded format such as PCM. Since there are a maximum of 192 time slots for a maximum of 288 ports, there is the possibility of call blockage on the bus for which provision must be made.

Of the 192 time slots, from eight to eleven time slots are permanently allocated for the transmission of tones such as dial tone, busy tone. Tones are transmitted in digital form as PCM companded 8 bit words in the designated time slots.

To provide a non-blocking arrangement for incoming trunk calls, a priority arrangement has been set up within the system memory. In the system memory, the channel allocator program of the system controller memory allocates the time slots or channels to calls on demand. Two time slots are allocated for each call, one for each direction of transmission.

Within the channel allocator, a designated number of channels is set into a priority or reserved pool. The designation of this number is made at the MAP panel by the use of user programmable byte.

This program module manages the allocation of the free voice channels up to 181 channels, in the system. The number of free channels for use by stations in the system is affected by two factors.

1. The number of programmed attendant consoles in the system. Each attendant has two dedicated channels, taken from the free channels queue and reserved for the attendant's use only. These channels will only be returned to the free channel queue when the console is removed from the data base. 2. The size of the reserved truck pool. The size of the trunk pool is determined by a user programmable byte which maybe inserted from the MAP panel. These reserved channels are for use only by incoming trunks when there are no free channels left in the system. For example, if the reserved trunk level is twenty, then the number of free channels left in the system is 161. When all 161 channels are in use any station attempting to get a channel will get a busy tone and any incoming trunk will get two of the twenty reserved channels. If all of the reserved channels are taken, the trunk will be queued waiting for channels to become free. Incoming trunks have priority over channels that become freed up.

When channels are requested, always two channels are assigned at a time. The channels are placed in the unshared TX and RX channel tables for the request port. When the channels are returned, the channels are taken from the unshared TX and RX channel tables and the shared and unshared channel tables are cleared to NA (off).

The free channel queue is initialized by placing all 181 free channels on the queue and setting the in and out pointers to indicate a full queue. When a channel is requested, it is popped off the bottom of the queue. When it is returned, it is pushed onto the top of the queue. This guarantees that all the channels will be used in equally.

Also controlled from the MAP panel is the transfer of data between the EEROM backup memory and the RAM program memory shown in FIG. 4 as a maintenance procedure.

The EEROM handler program is responsible for loading or copying data base between the EEROM and RAM.

The loading of RAM (from EEROM) takes place automatically during a system start-up, or upon issuing a load command from the control panel (CP)/RPD.

The copying from RAM to EEROM takes place upon issuing a copy command from command port as signaled from the MAP panel.

In either case, copy or load, the EEROM handler is scheduled with a copy or load signal. The entry point to the EEROM handler program is EEROM director, which will validate the input, and on error, will log the error and return to the system. If there is no error, the input is differentiated between load and copy and the appropriate routing is called to service the input.

The data is loaded or copied, and the data is verified. If there is a verification error, the process is repeated three times, after which the error is logged and the process is continued till the last address.

During servicing, harware commands are issued. The interrupt service routine will service the interrupt, and schedules the handler program. The handler program should know where the interrupt was issued, so that when scheduled, can maintain the continuity. Also the interrupt service routine should know that handler has not finished its servicing. This is achieved by using public calls, signal-proc and wait-proc, which will maintain the entry pointers, and a variable 'verify-mode-mask' which will be set if EEROM handler has not finished servicing.

After the load or copy is finished the program returns to the system.

As can be seen from the byte detail, only the bits, b0, b1, b2 and b3 are of significance in the input byte while only bits b0, b1 and b2 are significant for the output byte to the EEROM program port.

In this way, data is verified first and only changed if disagreement between the RAM data and the backup EEROM data is found. Data is checked on a byte by byte basis in a traverse of the system control program memory.

A third feature controlled from the MAP panel is that a transferring memory in the group controller from areas of the memory which are not shared with the system control memory to shared memory areas so that information stored in the memory may be read for diagnostic purposes. The group controller work areas are located in unshared RAM. To enable viewing of the contents of the group work areas, the following procedure is followed.

First, the memory area must be checked to see that it is out of service. If the area is in service, it must be monitored to determine when it goes out of service. When the area is found to be out of service, an indication of this condition is provided to ensure accidental problems.

Under the control of the user at the MAP panel, unshared data may be transferred into the shared memory area so that it may be called up for checking from the system control on a byte by byte basis. When the evaluation of the data is completed, it is transferred back to the unshared memory and the memory is restored to its normal operative condition.

In the present system, the group controller work areas are located in unshared RAM. The work areas were moved here due to the increase in the amount of data to be placed in shared memory for system/group controller protocol use. For diagnostics purposes, it becomes useful to view the contents of the group controller work areas. To make this possible, a mechanism was created in which the contents of unshared memory are swapped with the contents of shared memory. Once the areas are swapped the user can access the contents through the control panel.

The mechanism used to swap the contents of unshared memory with shared memory is described as follows:

From the control panel enter the following values:

| | | |
|---|---|---|
| 1. TYPE:F1 | | |
| ITEM:0X | ;Where X is group controller number | |
| DATA:0001 | ;Group controller X is placed in a disabled state | |
| Assume X is 1 | | |
| 2. TYPE:F0 | | |
| ITEM:E1A0 | ;System command byte | |
| DATA:44 | ;Inform group controller to get ready for test mode | |
| 3. TYPE:F0 | | |
| ITEM:E180 | ;Frame byte | |
| DATA:44 | ;Place group controller in test mode | |
| 4. TYPE:F0 | | |
| ITEM:E1A0 | ;System command byte | |
| DATA:01 | ;Return group controller to normal mode | |
| DATA:02 | ;Transfer unshared memory to shared memory | |
| DATA:03 | ;Initialize all 2K of memory | |
| DATA:04 | ;Do one normal scan | |
| DATA:05 | ;Transfer stack to shared memory | |
| For Group Controller 2 | Use Items E5A0, E580 | |
| For Group Controller 3 | Use Items E9A0, E980 | |
| For Group Controller 4 | Use Items EDA0, ED80 | |
| For Group Controller 5 | Use Items F1A0, F180 | |
| For Group Controller 6 | Use Items F5A0, F580 | |

In FIG. 5, we show the face of the MAP panel with its function key pad 44, its hexadecimal key pad 46 and display panel 42. To enter priority data in the MAP panel, first the CLR or clear button on key pad 44 is depressed. Next, the digits 00 in numeric key pad would be keyed in to indicate that a system control change is being made. A suitable two digit address is typed in (mapped to location) selecting for display the address of byte which contains the current number of channels in the queue reserved for trunk usage. The number of channels would appear in the display as read from the system memory. To enter new priority level data, a hexadecimal number is keyed in corresponding to the code representing the number of channels desired for the queue and thereafter the entry key is depressed to enter the information at the address memory bank.

For updating the backup EEROM memory, the MAP panel user first determines that there are no call processing tasks waiting to be done. The maintenance change is of lower priority than call processing. To institute a full review and comparison of the RAM to the EEROM, the copy button is depressed. The contents of the system assignment memory is transferred to the system back up memory. The process, as mentioned, is of a low priority, therefore any call processing would interrupt the transfer and return to transfer when the call processing is completed.

In most instances when programmable items such as extension numbers, assignment of numbers, assignment of ports, number of channels in the priority queue, class of service, and functions responsive to buttons on the station instruments, the change in assignment may be made in EEROM by depression of the copy button on the MAP panel once the change is made in the RAM through the MAP panel.

What is claimed is:

1. A computer controlled telecommunications system comprising a centralized system controller communicating with a plurality of group controllers over a multiple time slot time division bus, and in which each group controller controls the transfer of communication data for a group of ports of the system, each group controller including a first memory which may be accessed by said system controller for transfer of data from the particular group controller to the system controller and which may be accessed by said group controller for the transfer of data from said system controller to the particular group controller, and in which each group controller includes a second memory accessible only from its own group controller, means common to said system for addressing data in said second memory to temporarily transfer addressed data from said second memory to said first memory for the read out of said data over said system bus.

2. A computer controlled telecommunications system having a predetermined maximum number of ports having access to said system through a plurality of multi-port groups with said ports being comprised of stations and trunks, said system including a central system controller having access to said groups over a multiple time slot time division bus, and in which the number (n) of time slots for the handling of calls on the bus is less than the maximum number (p) ports of said system, means for allocating a pair of time slots on said bus to each call for processing call message data, means operative when the number of time slots having been allocated exceeds a predetermined number m (where m<n) for preventing the allocation of further time slots to stations seeking time slot allocation and for allocating time slots only to incoming trunks seeking the allocation of time slots, and for transmitting busy signals to stations seeking allocation of time slots and further means operative when the number of trunks allocated reaches the number (n) for placing all incoming trunks on queue awaiting time slot allocation while busying any stations seeking allocation of time slots.

3. In a processor-controlled time division telecommunications system including a plurality of time channels allocatable to handle calls through the system, in which there are a greater number (m) of ports having access to the channels of the system than the number (n) of time channels available for handling calls, in which a specialized number B of said channels are dedicated to the transmission of specific tones and in which the ports include station ports and trunk ports, the process for allocating channels for handling calls on a demand basis, whereby to prevent the allocation of channels to calls originated by stations of the system when the number of available channels reaches a predetermined number (A) where n>A while enabling a pair of channels to be allocated to calls originating at trunks of the systems, said process including the steps of keeping a number count of the channels available for selection and initiating a check of the type of port requesting channel allocation when the number of channels available reaches the number A or less, allocating call channels of said A or less number only when the check of channel type indicates a trunk port is seeking available channels, and for allocating a specific one of said B number of channels to a station port seeking an available channel when A or less channels are available for handling calls.

* * * * *